(12) United States Patent
Nguyen et al.

(10) Patent No.: US 6,725,931 B2
(45) Date of Patent: *Apr. 27, 2004

(54) METHODS OF CONSOLIDATING PROPPANT AND CONTROLLING FINES IN WELLS

(75) Inventors: Philip D. Nguyen, Duncan, OK (US); Jim Weaver, Duncan, OK (US); Ray Loghry, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 12 days.

This patent is subject to a terminal disclaimer.

(21) Appl. No.: 10/260,888

(22) Filed: Sep. 30, 2002

(65) Prior Publication Data

US 2004/0000402 A1 Jan. 1, 2004

Related U.S. Application Data

(63) Continuation-in-part of application No. 10/183,200, filed on Jun. 26, 2002, now Pat. No. 6,668,926.

(51) Int. Cl.⁷ .............................................. E21B 43/02
(52) U.S. Cl. .................................................... 166/280.2
(58) Field of Search ................................ 166/280, 281, 166/295, 308, 280.1, 280.2

(56) References Cited

U.S. PATENT DOCUMENTS

| | | |
|---|---|---|
| 4,042,032 A | 8/1977 | Anderson et al. ............ 166/276 |
| 4,070,865 A | 1/1978 | McLaughlin ................. 61/36 C |
| 4,074,760 A | 2/1978 | Copeland et al. ............ 166/276 |
| 4,336,842 A | 6/1982 | Graham et al. .............. 166/276 |
| 4,829,100 A | 5/1989 | Murphey et al. ............ 523/131 |
| 5,128,390 A | 7/1992 | Murphey et al. ............ 523/130 |
| 5,381,864 A | 1/1995 | Nguyen et al. .............. 166/280 |
| 5,393,810 A | 2/1995 | Harris et al. ................... 524/56 |
| 5,529,123 A | 6/1996 | Carpenter et al. ........... 166/293 |
| 5,609,207 A | 3/1997 | Dewprashad et al. ........ 166/276 |
| 5,839,510 A | 11/1998 | Weaver et al. ............... 166/276 |
| 5,921,317 A | 7/1999 | Dewprashad et al. ........ 166/208 |
| 5,924,488 A | 7/1999 | Nguyen et al. .............. 166/280 |
| 5,960,880 A | 10/1999 | Nguyen et al. .............. 166/280 |
| 6,003,600 A | 12/1999 | Nguyen et al. .............. 166/281 |
| 6,016,870 A | 1/2000 | Dewprashad et al. ........ 166/295 |
| 6,311,773 B1 | 11/2001 | Todd et al. ................... 166/280 |

*Primary Examiner*—William Neuder
(74) *Attorney, Agent, or Firm*—Robert A. Kent; C. Clark Dougherty, Jr.

(57) ABSTRACT

Improved methods of coating dry proppant particles with a hardenable resin composition, suspending the coated proppant particles in a fracturing fluid and consolidating the proppant particles after being placed in fractures into high strength permeable masses are provided. As the fractures are formed, a liquid hardenable resin component is mixed with a liquid hardening agent component to form a hardenable resin composition. The hardenable resin composition is coated onto dry proppant particles conveyed from a source thereof to form resin composition coated proppant particles, and the resin composition coated proppant particles are suspended in the fracturing fluid.

41 Claims, No Drawings

METHODS OF CONSOLIDATING PROPPANT AND CONTROLLING FINES IN WELLS

CROSS-REFERENCES TO RELATED APPLICATIONS

This Application Is A Continuation-In-Part of U.S. application Ser. No. 10/183,200 filed on Jun. 26, 2002 now U.S. Pat. No. 6,668,926.

BACKGROUND OF THE INVENTION

1. Field of the Invention

The present invention relates to improved methods of consolidating proppant in subterranean fractures formed in wells and controlling the production of fines with produced fluids therefrom.

2. Description of the Prior Art

Hydrocarbon producing wells are often stimulated by hydraulic fracturing treatments. In hydraulic fracturing treatments, a viscous fracturing fluid which also functions as a carrier fluid is pumped into a producing zone to be fractured at a rate and pressure such that one or more fractures are formed in the zone. Particulate solids, e.g., graded sand, for propping the fractures, commonly referred to in the art as "proppant" are suspended in a portion of the fracturing fluid so that the particulate solids are deposited in the fractures when the fracturing fluid is broken. That is, a delayed viscosity breaker is included in the fracturing fluid whereby the fracturing fluid reverts to a thin fluid which is returned to the surface. The proppant deposited in the fractures functions to prevent the fractures from closing so that conductive channels are formed through which produced hydrocarbons can readily flow.

In order to prevent the subsequent flow-back of proppant as well as loose or incompetent fine sand (referred to in the art as "fines") in the fractured zone with fluids produced therefrom, a portion of the proppant introduced into the fractures has heretofore been coated with a hardenable resin composition which is caused to harden and consolidate the proppant particles in the zone. Typically, the hardenable resin composition coated proppant is deposited in the fractures after a large quantity of uncoated proppant has been deposited therein. That is, the last portion of the proppant deposited in each fracture, referred to in the art as the "tail-end portion", is coated with the hardenable resin composition. When the viscous fracturing fluid which is the carrier fluid for the proppant is broken and reverts to a thin fluid as described above, the hardenable resin coated proppant is deposited in the fractures and the fractures close on the proppant. The partially closed fractures apply pressure on the hardenable resin coated proppant particles whereby the particles are forced into contact with each other while the resin composition hardens. It has heretofore been thought that the hardening of the resin composition under pressure brings about the consolidation of the resin coated proppant particles into a hard permeable pack having sufficient compressive and tensile strength to prevent unconsolidated proppant and formation fines from flowing out of the fractures with produced fluids. However, it has been found that as the fracturing fluid containing proppant without a hardenable resin composition coating thereon is carried into the fractures by the fracturing fluid, some of the proppant is continuously deposited in the bottom of the fractures adjacent to the well bore. This unconsolidated accumulation of non-resin coated proppant remains in the fractures adjacent to the well bore and when the hardenable resin coated proppant enters the fractures at the end of the proppant deposit, it does not displace the uncoated proppant at the bottom of the fractures. Instead, the hardenable resin coated proppant flows over the uncoated proppant. This results in unconsolidated proppant at the bottom of the fractures adjacent to the well bore. During the subsequent production of formation fluids through the propped fractures, the unconsolidated proppant at the bottom of the fractures as well as formation fines flow back with the formation fluids. The flow-back of the proppant and fines with the formation fluids is very detrimental in that it erodes metal goods, plugs piping and vessels and causes damage to valves, instruments and other production equipment.

In high temperature wells, i.e., wells having subterranean temperatures greater than about 300° F., the proppant packs in the fractures often become damaged as a result of formation fines flowing through the proppant packs. The presence of the fines in the proppant packs also reduce the produced fluid conductivities of the proppant packs.

Another problem encountered in the use of prior hardenable resin compositions for coating proppant particles is that the hardenable resin composition components, i.e., the liquid hardenable resin component and the liquid hardening agent component, have heretofore had very short shelf lives. That is, the shelf lives of the hardenable resin composition components have heretofore been as short as about four days or less. In addition, the hardenable resin composition components have heretofore had very low flash points, i.e., flash points of about 60° F. or below making them very dangerous to use.

Thus, there are needs for improved methods of consolidating proppant particles in subterranean fractures whereby the consolidated permeable proppant packs formed in the fractures have high formation fluid conductivities and do not permit the flow-back of proppant or allow the flow-through of formation fines. Further, there are needs for improved hardenable resin compositions and/or the components thereof that have long shelf lives and high flash points, i.e., flash points above 125° F.

SUMMARY OF THE INVENTION

The present invention provides improved methods of consolidating proppant and controlling fines in fractures formed in subterranean formations which meet the needs described above and overcome the deficiencies of the prior art. The methods are basically comprised of the following steps. A liquid hardenable resin component is provided comprised of a hardenable resin and optionally, a solvent for the resin. A liquid hardening agent component is provided comprised of a hardening agent. Optionally, the liquid hardening agent can also include one or more of a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid and/or a viscosifying agent for viscosifying the carrier fluid and dispersing the hardening agent when the hardening agent is a particulate solid. In addition, a source of dry proppant particles and a gelled liquid fracturing fluid are provided. The gelled liquid fracturing fluid is pumped into a subterranean zone to form one or more fractures therein and to place the hardenable resin composition coated proppant particles in the fractures. The liquid hardenable resin component is mixed with the liquid hardening agent component in amounts that form a liquid hardenable resin composition that remains tacky after hardening into a weakly consolidated permeable mass. The liquid hardenable resin composition is coated on dry proppant particles conveyed from the source of the dry proppant particles. The resulting hardenable resin composition coated proppant particles are mixed with the fracturing fluid whereby the hardenable resin composition coated proppant particles are suspended in the fracturing fluid. When the hardenable resin composition coated proppant particles have been placed in the one or more fractures, the pumping of the fracturing fluid, the mixing of the liquid hardenable resin component with the liquid hardening agent component, the coating of the dry proppant particles with the hardenable resin composition and the mixing with and suspending of the resin composition coated proppant particles in the fracturing fluid are terminated. The hardenable resin composition on the coated proppant particles is allowed to harden and to consolidate the proppant particles into one or more weakly consolidated permeable proppant packs while remaining tacky so that formation fines carried to the permeable proppant packs by produced formation fluids stick to the permeable proppant packs.

The sticking of the formation fines to the tacky resin coated permeable proppant packs prevents the formation fines from flowing into and through the proppant packs and thereby prevents the conductivities of the proppant packs from being reduced. Also, the use of the high-temperature hardenable resin composition described in this invention allows the tacky resin to withstand high temperatures and prevents the deterioration of the proppant packs at temperatures above about 300° F. In addition, the proppant packs prevent the flowback of proppant, the hardenable resin composition components have long shelf lives before being mixed and the solvent and carrier fluids have high flash points.

The objects, features and advantages of the present invention will be readily apparent to those skilled in the art upon a reading of the description of preferred embodiments which follows.

DESCRIPTION OF PREFERRED EMBODIMENTS

In accordance with the methods of the present invention, all of the proppant transported into the fractures is coated with a resin composition (preferably on-the-fly) and is suspended in the fracturing fluid as the fracturing fluid is pumped into the well bore and into the fractures. As a result, the resin coating on the proppant is fresh and when it hardens and consolidates the proppant, permeable proppant packs are formed in the fractures which prevent proppant flow-back. In addition, the hardenable resin composition components of this invention have long shelf lives, e.g., four months and longer. The components, i.e., the liquid hardenable resin component and the liquid hardening agent component are stored separately until they are mixed just prior to being coated onto proppant. The mixing of the components can be by batch mixing or the two components can be metered through a static mixer to obtain a homogeneous mixture before being coated on dry proppant particles while the proppant particles are conveyed in a sand screw. The amount of mixed liquid hardenable resin composition coated on the proppant ranges from about 0.1% to about 5% by weight of the proppant with about 3% being preferred.

As will be described further hereinbelow, in order to conserve the amount of hardening agent utilized for curing the hardenable resin which has been deposited on all of the proppant in the fractures, the volume ratio of liquid hardening agent component to liquid hardenable resin component utilized in accordance with this invention can be varied. In a preferred technique, the volume ratio of the liquid hardening agent component to the liquid hardenable resin component is varied from an initial volume ratio at the beginning of the proppant suspended in the fracturing fluid to a lower volume ratio as the middle portion of the proppant is suspended in the fracturing fluid and then back to the initial volume ratio at the end portion of the proppant suspended in the fracturing fluid. This technique results in consolidated proppant packs in the fractures which have high strength at the forward ends of the packs, less strength at the middle portions of the packs and high strength at the end portions of the packs. The middle portions of the packs tend to be placed deeply in the fractures far away from the well bore. Since all of the proppant is consolidated, there is no unconsolidated proppant remaining in the bottoms of the fractures and as a result proppant flow-back does not occur.

In accordance with one improved method of this invention, dry proppant particles are coated with the hardenable resin composition, preferably on-the-fly, the coated proppant particles are suspended in the fracturing fluid, preferably on-the-fly, and the resulting hardenable resin composition coated proppant particles are placed in one or more fractures formed in a subterranean zone. The method is basically comprised of the following steps. A liquid hardenable resin component is provided comprised of a hardenable resin and optionally, a solvent for the resin having a high flash point. When used, the solvent is added to the resin to reduce its viscosity for ease of handling, mixing and transferring. However, as will be understood by those skilled in the art, the solvent can be omitted and the liquid hardenable resin can be heated to reduce its viscosity. A liquid hardening agent component is provided comprised of a hardening agent, and optionally, one or more of a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid having a high flash point and/or a viscosifying agent for viscosifying the carrier fluid and dispersing the hardening agent when the hardening agent is a particulate solid. When the hardening agent is a particulate solid, it can be added separately to the resin composition and the viscosifying agent can be omitted. Also, when a liquid hardening agent is used, the viscosifying agent can be omitted. In addition to the liquid hardenable resin component and the liquid hardening agent component, dry proppant particles and a gelled liquid fracturing fluid are provided. The gelled liquid fracturing fluid is pumped into a subterranean zone to form one or more fractures therein and to place the resin composition coated proppant particles in the fractures. As the fractures are formed by the fracturing fluid, the liquid hardenable resin component is mixed with the liquid hardening agent component, preferably on-the-fly, in amounts that form a liquid hardenable resin composition that remains tacky after hardening. The hardenable resin composition is continuously coated on the dry proppant particles which are conveyed from the source thereof, preferably on-the-fly, to form hardenable resin composition coated proppant particles. The hardenable resin composition coated proppant particles are continuously mixed with the fracturing fluid, preferably on-the-fly, whereby the hardenable resin composition coated proppant particles are suspended therein. Thereafter, the hardenable resin composition coated proppant particles are carried into the fractures whereupon the pumping of the fracturing fluid and other related steps are terminated. As is well understood by those skilled in the art, the gelled liquid fracturing fluid can include a viscosity breaker which causes it to revert to a thin fluid so that the resin composition coated proppant particles are deposited in the fractures and the fracturing fluid is returned to the surface.

The term "on-the-fly" is used herein to mean that a flowing stream is continuously introduced into another flowing stream so that the streams are combined and mixed while continuing to flow as a single stream. While the mixing of the liquid hardenable resin component with the liquid hardening agent component to form the hardenable resin composition, the coating of the dry proppant particles with the hardenable resin composition and the mixing of the hardenable resin coated proppant particles with the fracturing fluid are all preferably accomplished on-the-fly, as is well understood by those skilled in the art such mixing can also be accomplished by batch mixing or partial batch mixing.

As is also well understood, when the fracturing fluid is broken and the hardenable resin composition coated proppant particles are deposited in the fractures formed, the fractures close on the proppant particles. The partially closed fractures apply pressure on the hardenable resin composition coated proppant whereby the proppant particles are forced into contact with each other while the resin composition hardens. The hardening of the resin composition under pressure helps bring about the consolidation of the resin coated particles into a tacky permeable pack having sufficient compressive strength to prevent unconsolidated proppant and formation fines from flowing out of the fractures with produced fluids. In fracture treatments carried out in unconsolidated formations, good consolidation of proppant is required in the perforations which extend from the inside of the well bore through casing and cement into the unconsolidated formation as well as in the fractured portions of the unconsolidated formation surrounding the well bore. The proppant which is deposited in the perforations is coated with the hardenable resin composition and is caused to harden therein. The resulting consolidated proppant in the perforations and fractures contributes to the prevention of proppant flow-back. However, there is often little closure pressure applied to the hardenable resin coated proppant in the fractures close to the well bore and there is no closure pressure applied to the hardenable resin coated proppant particles in the perforations. In addition, the hardenable resin coated proppant particles can be separated from each other by films of the gelled fracturing fluid and because of the presence of the fracturing fluid films, the proppant particles do not sufficiently consolidate. As a result, the consolidated permeable packs formed in the perforations and fractures often have less than sufficient compressive strength to prevent unconsolidated proppant and formation fines from flowing out of the perforations and fractures. These problems are solved by including in the hardenable resin composition one or more hydrolyzable esters which function to break gelled fracturing fluid films on the particles, and a surfactant for facilitating the coating of the resin composition on the proppant particles and for causing the hardenable resin composition to flow to the contact points between adjacent resin coated proppant particles so that the particles are consolidated into a high strength permeable mass.

Examples of hardenable resins which can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The organic resin utilized is included in the liquid hardenable resin component in an amount in the range of from about 70% to about 100% by weight of the liquid hardenable resin component, preferably an amount of about 85%.

Examples of solvents having high flash points (above about 125° F.) which can optionally be used for the hardenable resin in the liquid hardenable resin component include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The amount of the solvent utilized in the liquid hardenable resin component is in the range of from about 0% to about 30% by weight of the liquid hardenable resin component, preferably in an amount of about 15%.

Examples of the hardening agents which can be used in the liquid hardening agent component include, but are not limited to, amines, aromatic amines, polyamines, aliphatic amines, cyclo-aliphatic amines, amides, polyamides, diethyltoluenediamine 4,4'-diaminodiphenyl sulfone, 2-ethyl-4-methyl imidazole and 1,1,3-trichlorotrifluoroacetone. Of these, 4,4'-diaminodiphenyl sulfone is preferred. The hardening agent is included in the liquid hardening agent component in an amount in the range of from about 40% to about 60% by weight of the liquid hardening agent component, preferably in an amount of about 50%.

Examples of silane coupling agents which can optionally be used in the liquid hardening agent component include, but are not limited to, N-2-(aminoethyl)-3-aminopropyl-trimethoxysilane, 3-glycidoxypropyltrimethoxysilane and n-beta-(aminoethyl)-gamma-aminopropyltrimethoxysilane. Of these, n-beta-(aminoethyl)-gamma-aminopropyltrimethoxysilane is preferred. When used, the silane coupling agent is included in the liquid hardening agent component in an amount in the range of from about 0.1% to about 3% by weight of the liquid hardening agent component.

Examples of hydrolyzable esters which can optionally be utilized in the liquid hardening agent component for facilitating the coating of the resin composition on the proppant particles and for breaking gelled fracturing fluid films thereon include, but are not limited to, a mixture of dimethylglutarate, dimethyladipate and dimethylsuccinate, sorbitol, catechol, dimethylthiolate, methyl salicylate, dimethyl salicylate, dimethylsuccinate and ter-butylhydroperoxide. Of these, a mixture of dimethylglutarate, dimethyladipate and dimethylsuccinate is preferred. When used, the ester or esters are present in the liquid hardening agent component in an amount in the range of from about 0.1% to about 3% by weight of the liquid hardening agent component, preferably in an amount of about 2%.

The surfactants which can optionally be utilized in the liquid hardening agent component for facilitating the coating of the resin on the proppant particles and for causing the hardenable resin to flow to the contact points between adjacent resin coated proppant particles include, but are not limited to, an ethoxylated nonyl phenol phosphate ester, mixtures of one or more cationic surfactants and one or more non-ionic surfactants and an alkyl phosphonate surfactant. The mixtures of one or more cationic and nonionic surfactants are described in U.S. Pat. No. 6,311,733 issued to Todd et al. on Nov. 6, 2001 which is incorporated herein by reference thereto. Of the surfactants that can be used, a $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component, preferably in an amount of about 10%.

The liquid carrier fluid having a high flash point (above about 125° F.) which can optionally be utilized in the liquid hardening agent component is selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. When used, the liquid carrier fluid is present in the liquid hardening agent component in an amount in the range of from about 20% to about 40% by weight of the liquid hardening agent component, preferably in an amount of about 30%.

Examples of viscosifying agents that can optionally be utilized in the liquid hardening agent component, include, but are not limited to hydroxypropyl cellulose and organophilic clays. Of these, organophilic clay is preferred. Organophilic clays are the reaction product of purified smectite clay (either hectorite or bentonite) and a quaternary ammonium salt. When used, the viscosifying agent is present in the liquid hardening agent component in an amount in the range of from about 0% to about 3% by weight of the liquid hardening agent component, preferably in an amount of about 1%.

As mentioned above, the hardenable resin is present in the liquid hardenable resin component in an amount in the range of from about 70% to about 100% by weight of the liquid hardenable resin component and the hardening agent is present in the liquid hardening agent component in an amount in the range of from about 40% to about 60% by weight of the liquid hardening agent. In order to form a liquid hardenable resin composition that weakly consolidates proppant particles and that is tacky after hardening, the liquid hardenable resin component and the liquid hardening agent component are mixed in a weight ratio of the liquid hardenable resin component to the liquid hardening agent in the range of from about 99:1 to about 90:10, more preferably in the amount at about 95:5 weight ratio.

A variety of fracturing fluids can be utilized in accordance with the present invention including aqueous gels, emulsions and other fluids utilized for forming fractures in subterranean zones and carrying resin composition coated proppant particles into the fractures. The aqueous gels are generally comprised of water and one or more gelling agents. The emulsions can be comprised of two immiscible liquids such as an aqueous gelled liquid and a liquefied, normally gaseous fluid, such as nitrogen.

The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid reduces fluid loss and allows the fracturing fluid to transport significant quantities of suspended proppant particles. The water utilized to form the fracturing fluid can be fresh water, salt water, brine or any other aqueous liquid which does not adversely react with the other components utilized in accordance with this invention.

A variety of gelling agents can be utilized including hydratable polymers which contain one or more functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Examples of natural hydratable polymers containing the foregoing functional groups and units which are particularly useful in accordance with the present invention include guar gum and derivatives thereof such as hydroxypropyl guar and cellulose derivatives such as hydroxyethyl cellulose. Hydratable synthetic polymers and copolymers which contain the above mentioned functional groups can also be utilized. Examples of such synthetic polymers include, but are not limited to, polyacrylate, polymethacrylate, polyacrylamide, polyvinyl alcohol and polyvinylpyrrolidone. The gelling agent used is generally combined with the water in the fracturing fluid in an amount in the range of from about 0.1% to about 1% by weight of the water.

Examples of cross-linking agents which can be utilized to further increase the viscosity of a gelled fracturing fluid are alkali metal borates, borax, boric acid and compounds which are capable of releasing multivalent metal ions in aqueous solutions. Examples of the multivalent metal ions are chromium, zirconium, antimony, titanium, iron, zinc or aluminum. When used, the cross-linking agent is generally added to the gelled water in an amount in the range of from about 0.01% to about 1% by weight of the water.

The above described gelled or gelled and cross-linked fracturing fluids typically also include internal delayed gel breakers such as those of the enzyme type, the oxidizing type, the acid buffer type and the temperature activated type, all of which are well known to those skilled in the art. The gel breakers cause the viscous carrier fluids to revert to thin fluids that can be produced back to the surface after they have been used to place proppant particles in subterranean fractures. The gel breaker used is generally present in the fracturing fluid in an amount in the range of from about 1% to about 5% by weight of the gelling agent therein. The fracturing fluids can also include one or more of a variety of well known additives such as gel stabilizers, fluid loss control additives, clay stabilizers, bacteriacides and the like.

The proppant particles utilized in accordance with the present invention are generally of a size such that formation particulate solids which migrate with produced fluids are prevented from being produced from the subterranean zone. Various kinds of proppant can be utilized including graded sand, bauxite, ceramic materials, glass materials, walnut hulls, polymer beads and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

A preferred improved method of this invention for consolidating proppant and controlling fines in one or more fractures formed in a subterranean formation comprises the steps of: (a) providing a liquid hardenable resin component comprised of a hardenable resin; (b) providing a liquid hardening agent component comprised of a particulate solid hardening agent; (c) providing a source of dry proppant particles; (d) providing a gelled liquid fracturing fluid; (e) pumping the gelled liquid fracturing fluid into the subterranean zone to form the one or more fractures therein and to place proppant particles in the fractures; (f) mixing the liquid hardenable resin component with the liquid hardening agent component in amounts that form a liquid hardenable resin composition; (g) coating the liquid hardenable resin composition produced in step (f) onto the dry proppant particles conveyed from the source thereof to form hardenable resin composition coated proppant particles; (h) mixing the resin composition coated proppant particles produced in step (g) with the fracturing fluid pumped in accordance with step (e) whereby the resin composition coated proppant particles are suspended therein; (i) terminating steps (e), (f), (g) and (h) when the resin composition coated proppant particles have been placed in the one or more fractures; and 0) allowing the hardenable resin composition on the resin composition coated proppant particles to harden and weakly consolidate the proppant particles into one or more permeable proppant packs while remaining tacky so that fine solid formation particles carried to the permeable proppant packs by produced formation fluids stick to the permeable proppant packs.

Another preferred improved method for consolidating proppant and controlling fines in one or more fractures formed in a subterranean formation comprises the steps of: (a) providing a liquid hardenable resin component comprised of a hardenable resin; (b) providing a liquid hardening agent component comprised of a particulate solid hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles and a liquid carrier fluid; and (c) providing a source of dry proppant particles; (d) providing a gelled liquid fracturing fluid; (e) pumping the gelled liquid fracturing fluid into the subterranean formation to form the one or more fractures therein and to place proppant particles in the fractures; (f) mixing the liquid hardenable resin component with the liquid hardening agent component in amounts that form a liquid hardenable resin composition that remains tacky after hardening; (g) coating the liquid hardenable resin composition formed in step (f) onto dry proppant particles conveyed from the source thereof to form hardenable resin composition coated proppant particles; (h) mixing the hardenable resin composition coated proppant particles produced in step (g) with the fracturing fluid pumped in accordance with step (e) whereby the resin composition coated proppant particles are suspended therein; (i) terminating steps (e), (f), (g) and (h) when the resin composition coated proppant particles have been placed in the one or more fractures; and (j) allowing the hardenable resin composition on the resin composition coated proppant particles to harden and weakly consolidate the proppant particles into one or more permeable proppant packs while remaining tacky so that fine solid formation particles carried to the permeable proppant packs by produced formation fluids stick to the permeable proppant packs.

In order to further illustrate the methods of the present invention, the following examples are given.

EXAMPLE I

Resin mixtures were prepared using two separate formulations:

Formulation I—99% of liquid hardenable resin and 1% of liquid hardening agent (by weight of resin mixture).

Formulation II—95% of liquid hardenable resin and 5% of liquid hardening agent (by weight of resin mixture).

Each resin mixture was then dry coated onto 20/40-mesh bauxite proppant in the amount of 3% (by weight of proppant). The resin-treated proppant was then mixed with carboxymethylhydroxypropyl guar (CMHPG) based fracturing fluid prior to cross-linking and stirring with a stirrer to simulate pumping for 1 hour at 175° F. The proppant slurry was then transferred and packed in a brass chamber without closure stress and then placed in an oven at 325° F. for various time intervals. Observation of the materials at the end of each heated interval indicated that the resin coated on the proppant remained quite tacky and the proppant grains attached readily to one another, even after being exposed to 325° F. temperature for various time periods (Table I). There was no consolidate for the proppant pack treated with 99:1 resin mixture, even though the proppant grains remain very tacky. The proppant pack treated with 95:5 resin mixture became weakly consolidated, with unconfined compressive strengths less than 5 psi. However, the proppant grains remain very tacky.

TABLE I

| Time at 325° F. | 99% Hardenable Resin & 1% Hardening Agent | 95% Hardenable Resin & 5% Hardening Agent |
| --- | --- | --- |
| 1 day | Tacky, unformable | Tacky, weakly consolidated |
| 5 days | Tacky, unformable | Tacky, weakly consolidated |
| 14 days | Tacky, unformable | Tacky, weakly consolidated |

EXAMPLE 2

To determine the effect of the composition of the present invention upon formation fracture conductivity the following tests were performed. Resin according to Formulation II of Example 1 was dry coated onto 20/40 mesh bauxite proppant at the concentration levels shown in Table II. The various resin treated proppants then were packed into API conductivity test cells and placed in a press to simulate closure stress at the levels shown in the Table. The temperature was controlled at 300° F. Water was utilized as the flowing fluid to determine the fracture conductivity. The conductivity was measured at the initial closure stress level several times over a period of 48 hours until a stable value was obtained. When a stable value was achieved, the closure stress was increased to the next level and new measurements were made until a stable reading was obtained.

TABLE II

| Closure Stress, psi | 0% Resin Conductivity, mD-ft | 1% Resin Conductivity, mD-ft | 2% Resin Conductivity, mD-ft | 3% Resin Conductivity, mD-ft |
| --- | --- | --- | --- | --- |
| 4,000 | 6,613 | 7,965 | 9,117 | 7,458 |
| 6,000 | 4,801 | 6,150 | 6,069 | 5,035 |
| 8,000 | 3,368 | 4,055 | 4,285 | 3,121 |
| 10,000 | 2,638 | 2,847 | 2,931 | 2,450 |

The results of the tests clearly illustrate that the presence of the resin composition of the present invention on the proppant does not adversely effect the conductivity of the fracture and in fact resulted in higher conductivity at various application concentrations and closure stresses than untreated proppant.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of consolidating proppant and controlling fines in one or more fractures formed in a subterranean formation comprising the steps of:
    (a) providing a liquid hardenable resin component comprised of a hardenable resin;
    (b) providing a liquid hardening agent component comprised of a hardening agent;
    (c) providing a source of dry proppant particles;
    (d) providing a gelled liquid fracturing fluid;
    (e) pumping said gelled liquid fracturing fluid into said subterranean formation to form said one or more fractures therein and to place proppant particles in said fractures;
    (f) mixing said liquid hardenable resin component with said liquid hardening agent component in amounts that form a liquid hardenable resin composition that remains tacky after hardening;
    (g) coating said liquid hardenable resin composition formed in step (f) onto said dry proppant particles conveyed from said source thereof to form hardenable resin composition coated proppant particles;
    (h) mixing said hardenable resin composition coated proppant particles produced in step (g) with said fracturing fluid pumped in accordance with step (e) whereby said hardenable resin composition coated proppant particles are suspended therein;
    (i) terminating steps (e), (f), (g) and (h) when said resin composition coated proppant particles have been placed in said one or more fractures; and
    (j) allowing said hardenable resin composition on said resin composition coated proppant particles to harden and weakly consolidate said proppant particles into one or more permeable proppant packs while remaining tacky so that fine solid formation particles carried to said permeable proppant packs by produced formation fluids stick to said permeable proppant packs.

2. The method of claim 1 wherein said hardenable resin is present in said liquid hardenable resin component in an amount in the range of from about 70% to about 100% by weight thereof.

3. The method of claim 2 wherein said hardening agent is present in said liquid hardening agent component in an amount in the range of from about 40% to about 60% by weight thereof.

4. The method of claim 3 wherein said liquid hardenable resin component and said liquid hardening agent component are mixed in accordance with step (f) in a weight ratio of said liquid hardenable resin component to said liquid hardening agent component in the range of from about 99:1 to about 90:10.

5. The method of claim 1 wherein said hardenable resin in said liquid hardenable resin component is an organic resin comprising at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

6. The method of claim 1 wherein said hardenable resin in said liquid hardenable resin component is comprised of bisphenol A-epichlorohydrin resin.

7. The method of claim 1 which further comprises a solvent for said resin in said liquid hardenable resin component.

8. The method of claim 7 wherein said solvent for said resin in said liquid hardenable resin component comprises at least one member selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

9. The method of claim 7 wherein said solvent for said resin is comprised of dipropylene glycol methyl ether.

10. The method of claim 1 wherein said hardening agent in said liquid hardening agent component comprises at least one member selected from the group consisting of amines, aromatic amines, polyamines, aliphatic amines, cycloaliphatic amines, amides, polyamides, diethyltoluenediamine 4,4'-diaminodiphenyl sulfone, 2-ethyl-4-methyl imidazole and 1,1,3-trichlorotrifluoroacetone.

11. The method of claim 1 wherein said hardening agent in said liquid hardening agent component is comprised of 4,4'-diaminodiphenyl sulfone.

12. The method of claim 1 wherein said liquid hardening agent component further comprises a silane coupling agent selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

13. The method of claim 12 wherein said silane coupling agent is n-beta-(aminoethyl)-gamma-aminopropyltrimethoxysilane.

14. The method of claim 1 wherein said liquid hardening agent component further comprises a hydrolyzable ester for breaking gelled fracturing fluid films on said proppant particles selected from the group consisting of a mixture of dimethylglutarate, dimethyladipate and dimethylsuccinate, sorbitol, catechol, dimethylthiolate, methyl salicylate, dimethyl salicylate, dimethyl succinate and ter-butylhydroperoxide.

15. The method of claim 14 wherein said hydrolyzable ester for breaking gelled fracturing fluid films on said proppant particles is a mixture of dimethylglutarate, dimethyladipate and dimethylsuccinate.

16. The method of claim 1 wherein said liquid hardening agent component further comprises a surfactant for facilitating the coating of said hardenable resin on said proppant particles and for causing said hardenable resin to flow to the contact points between adjacent resin coated proppant particles selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

17. The method of claim 16 wherein said surfactant for facilitating the coating of said hardenable resin on said proppant particles and for causing said hardenable resin to flow to the contact points between adjacent resin coated proppant particles is a $C_{12}$–$C_{22}$ alkyl phosphonate surfactant.

18. The method of claim 1 wherein said liquid hardening agent component further comprises a liquid carrier fluid selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

19. The method of claim 18 wherein said liquid carrier fluid is dipropylene glycol methyl ether.

20. The method of claim 1 wherein said liquid hardening agent component further comprises a viscosifying agent for viscosifying said carrier fluid and dispersing said hardening agent when said hardening agent is a particulate solid.

21. The method of claim 20 wherein said viscosifying agent is an organophilic clay.

22. A method of consolidating proppant and controlling fines in one or more fractures formed in a subterranean formation comprising the steps of:
  (a) providing a liquid hardenable resin component comprised of a hardenable resin;
  (b) providing a liquid hardening agent component comprised of a hardening agent, a silane coupling agent, a hydrolyzable ester for breaking fracturing fluid films on said proppant particles, a surfactant for facilitating the coating of said resin on said proppant particles and for causing said hardenable resin to flow to the contact points between adjacent resin coated proppant particles and a liquid carrier fluid; and
  (c) providing a source of dry proppant particles;
  (d) providing a gelled liquid fracturing fluid;
  (e) pumping said gelled liquid fracturing fluid into said subterranean formation to form said one or more fractures therein and to place proppant particles in said fractures;
  (f) mixing said liquid hardenable resin component with said liquid hardening agent component in amounts that form a liquid hardenable resin composition that remains tacky after hardening;
  (g) coating said liquid hardenable resin composition formed in step (f) onto dry proppant particles conveyed from said source thereof to form hardenable resin composition coated proppant particles;
  (h) mixing said hardenable resin composition coated proppant particles produced in step (g) with said fracturing fluid pumped in accordance with step (e) whereby said resin composition coated proppant particles are suspended therein;
  (i) terminating steps (e), (f), (g) and (h) when said resin composition coated proppant particles have been placed in said one or more fractures; and
  (j) allowing said hardenable resin composition on said resin composition coated proppant particles to harden and weakly consolidate said proppant particles into one or more permeable proppant packs while remaining tacky so that fine solid formation particles carried to said permeable proppant packs by produced formation fluids stick to said permeable proppant packs.

23. The method of claim 22 wherein said hardenable resin is present in said liquid hardenable resin component in an amount in the range of from about 70% to about 100% by weight thereof.

24. The method of claim 23 wherein said hardening agent is present in said liquid hardening agent component in an amount in the range of from about 40% to about 60% by weight thereof.

25. The method of claim 22 wherein said hardenable resin in said liquid hardenable resin component is an organic resin comprising at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

26. The method of claim 22 wherein said hardenable resin in said liquid hardenable resin component is comprised of a bisphenol A-epichlorohydrin resin.

27. The method of claim 22 which further comprises a solvent for said resin in said liquid hardenable resin component.

28. The method of claim 27 wherein said solvent for said resin is selected from the group consisting of dipropylene glycol methyl ether, dipropyl glycol methyl ether, dimethyl formamide, diethyleneglycol methyl ether, ethyleneglycol butyl ether, diethyleneglycol butyl ether, propylene carbonate, d'limonene and fatty acid methyl esters.

29. The method of claim 27 wherein said solvent for said resin is dipropylene glycol methyl ether.

30. The method of claim 22 wherein said hardening agent is selected from the group consisting of amines, aromatic amines, polyamines, aliphatic amines, cyclo-aliphatic amines, amides, polyamides, diethyltoluenediamine 4,4'-diaminodiphenyl sulfone, 2-ethyl-4-methyl imidazole and 1,1,3-trichlorotrifluoroacetone.

31. The method of claim 22 wherein said hardening agent is 4,4'-diaminodiphenyl sulfone.

32. The method of claim 22 wherein said silane coupling agent is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

33. The method of claim 22 wherein said silane coupling agent is n-beta-(aminoethyl)-gamma-aminopropyltrimethoxysilane.

34. The method of claim 22 wherein said hydrolyzable ester for breaking gelled fracturing fluid films on said proppant particles is selected from the group consisting of a mixture of dimethylglutarate, dimethyladipate and dimethylsuccinate, sorbitol, catechol, dimethylthiolate, methyl salicylate, dimethyl salicylate, dimethyl succinate and ter-butylhydroperoxide.

35. The method of claim 22 wherein said hydrolyzable ester for breaking gelled fracturing fluid films on said proppant particles is a mixture of dimethylglutarate, dimethyladipate and dimethylsuccinate.

36. The method of claim 22 wherein said surfactant for facilitating the coating of said resin on said proppant particles and for causing said hardenable resin to flow to the contact points between adjacent resin coated proppant particles is selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

37. The method of claim 22 wherein said surfactant for facilitating the coating of said resin on said proppant particles and for causing said hardenable resin to flow to the contact points between adjacent resin coated proppant particles is a $C_{12}$–$C_{22}$ alkyl phosphonate surfactant.

38. The method of claim 22 wherein said liquid carrier fluid is selected from the group consisting of dipropylene glycol methyl ether, dipropylene glycol dimethyl ether, dimethyl formamide, diethyleneglycol methyl ether, ethylene glycol butyl ether, diethyleneglycol butyl ether, propylene carbonate, d'limonene and fatty acid methyl esters.

39. The method of claim 22 wherein said liquid carrier fluid is dipropylene glycol methyl ether.

40. The method of claim 22 which further comprises a viscosifying agent for viscosifying said carrier fluid and dispersing said hardening agent when said hardening agent is a particulate solid.

41. The method of claim 40 wherein said viscosifying agent is an organophilic clay.

* * * * *